June 18, 1963

D. W. GARNETT ETAL 3,094,182

MATERIAL FEEDING AND WEIGHING APPARATUS

Filed June 29, 1959

INVENTORS
DONALD W. GARNETT
GUSTAV A. OLOFSSON

BY Whittemore, Hulbert
Belknap

ATTORNEYS

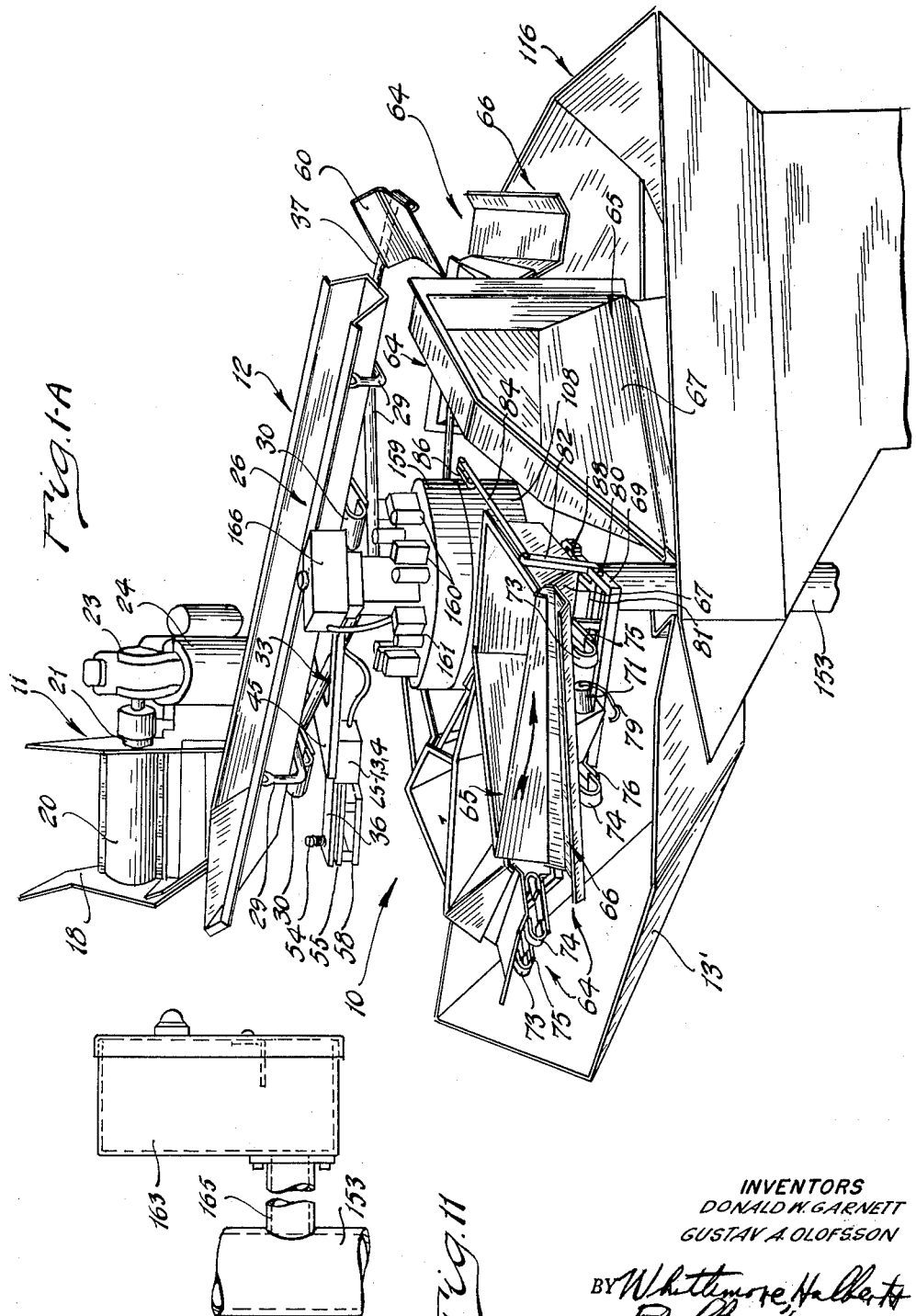

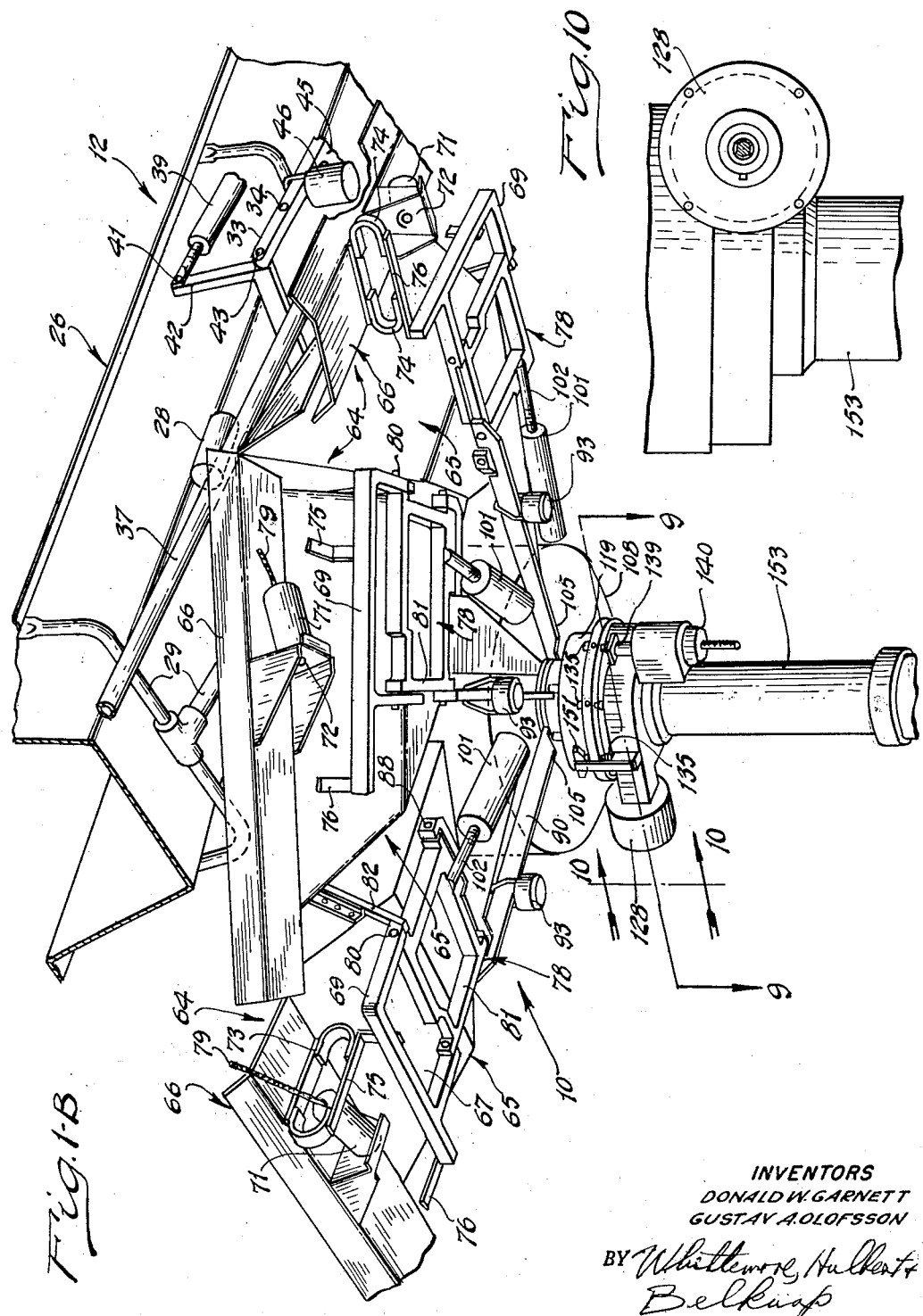

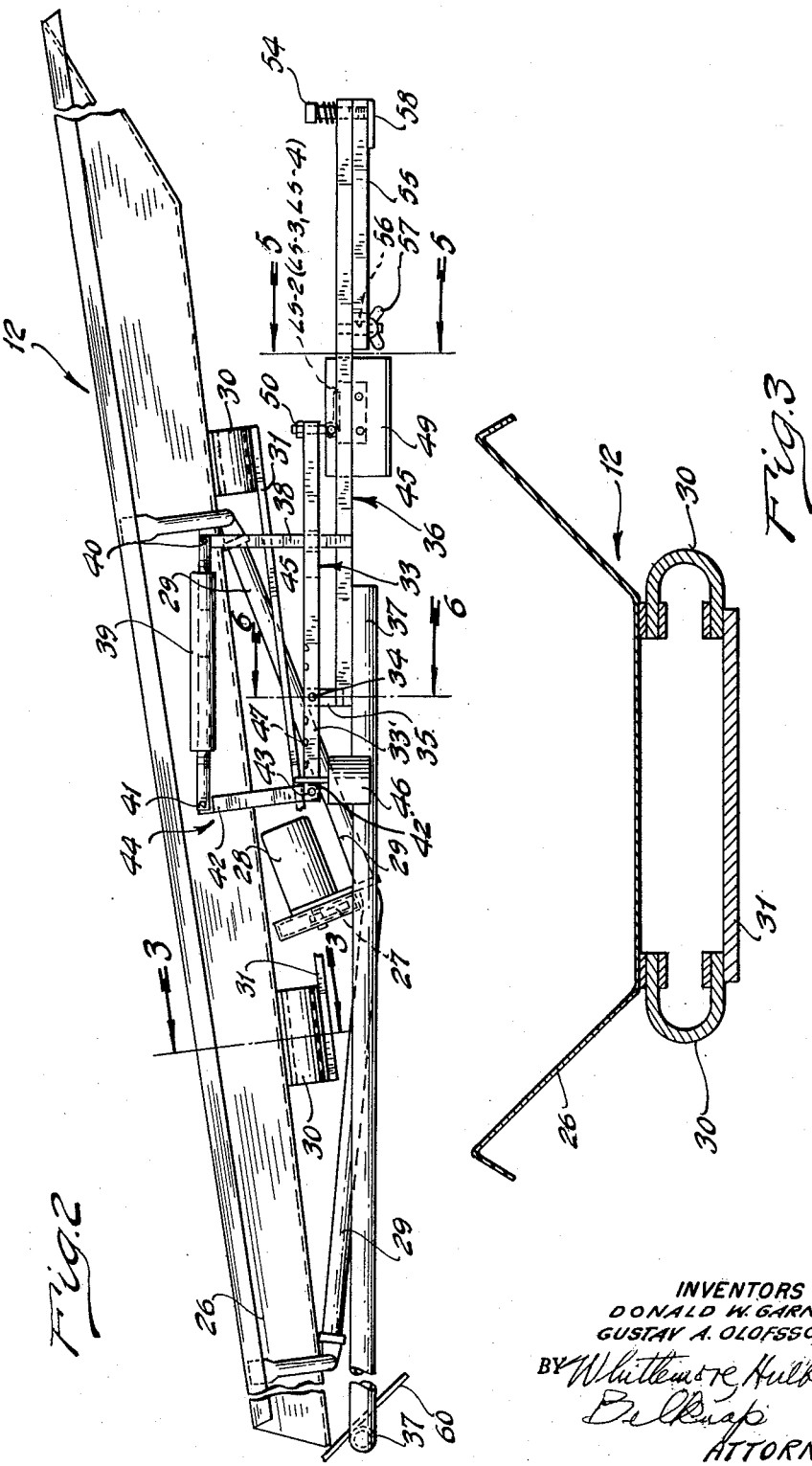

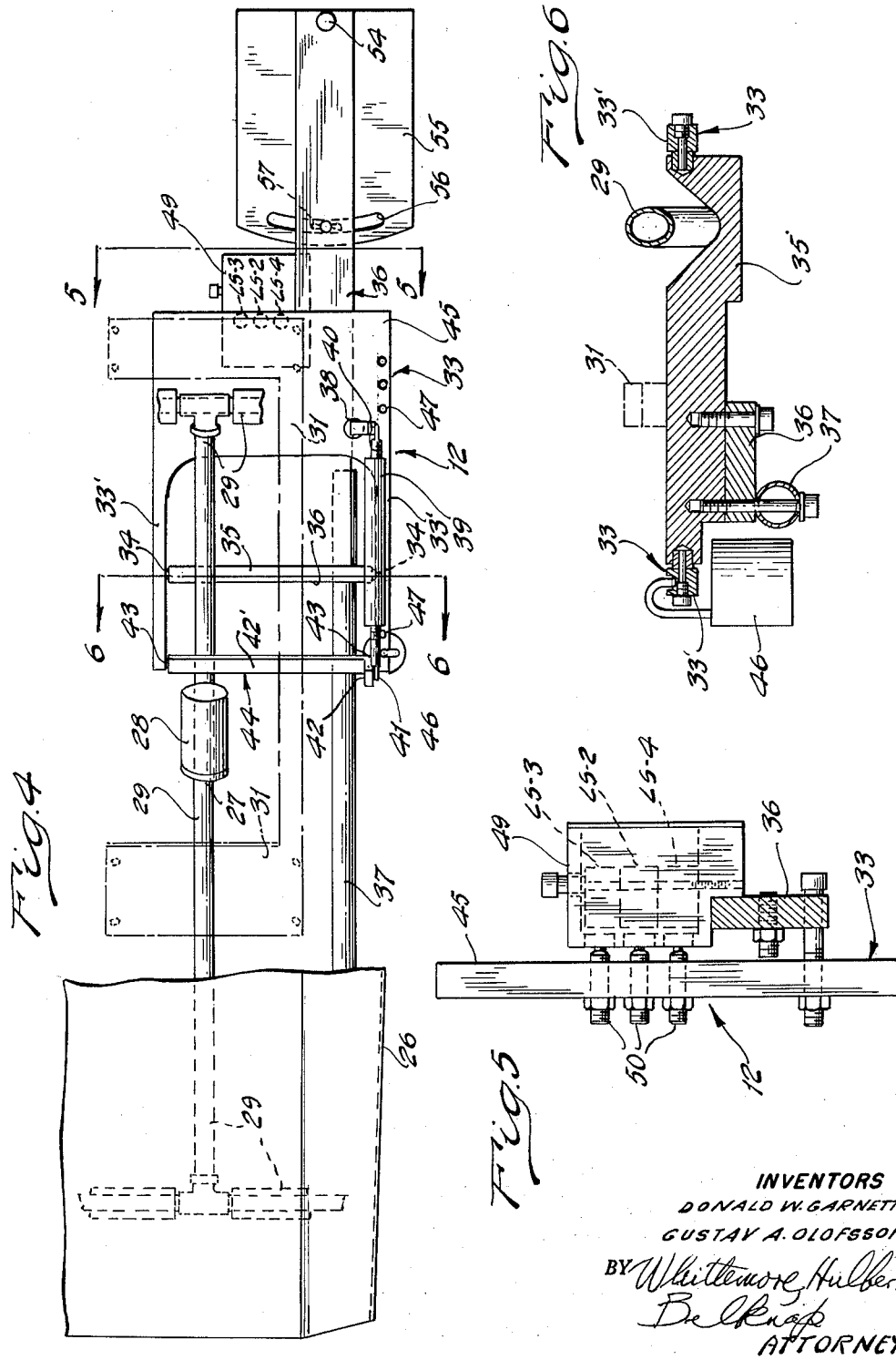

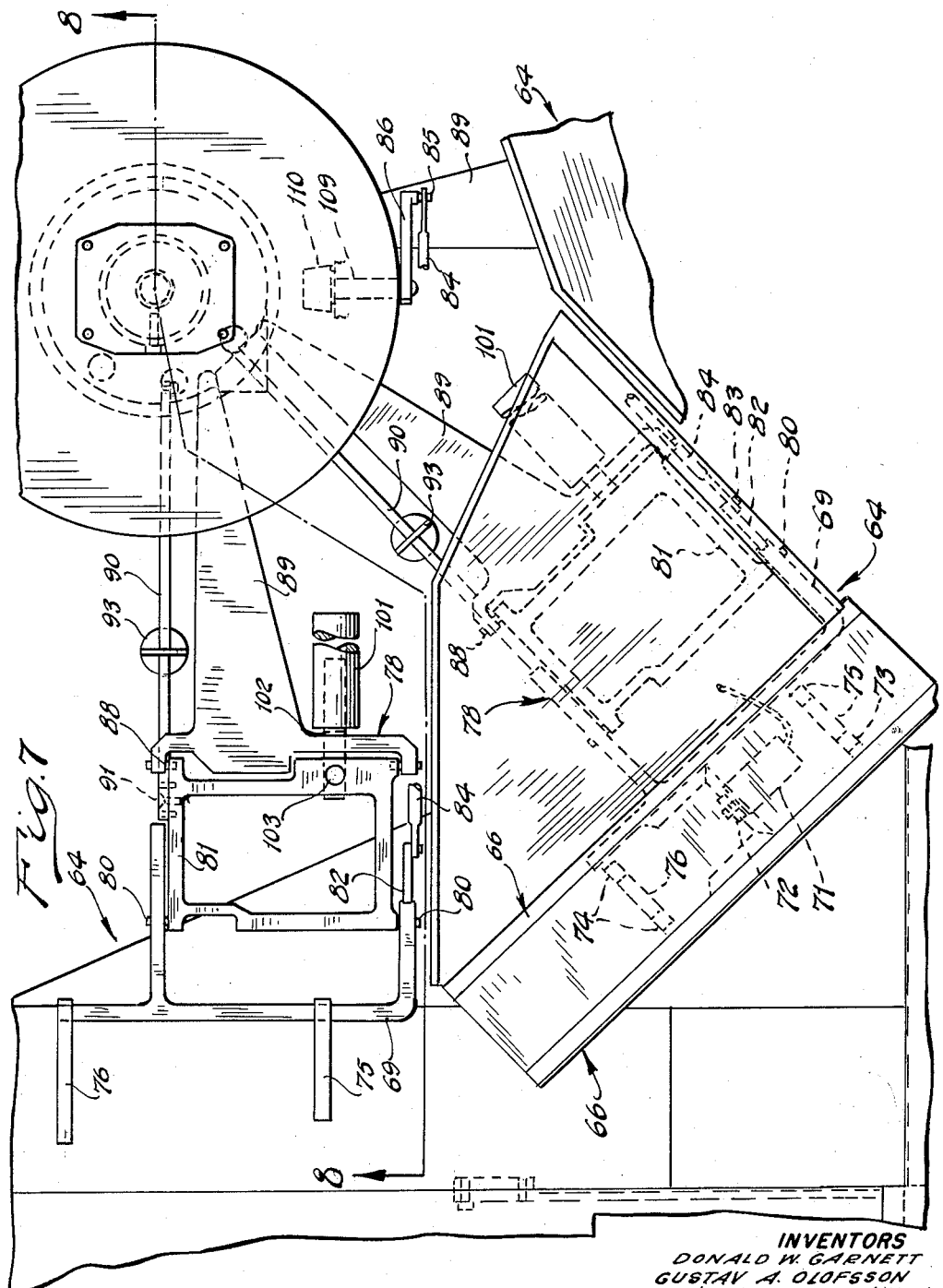

June 18, 1963

D. W. GARNETT ETAL 3,094,182

MATERIAL FEEDING AND WEIGHING APPARATUS

Filed June 29, 1959

INVENTORS
DONALD W. GARNETT
GUSTAV A. OLOFSSON

BY Whitemore Halbert
Belknap
ATTORNEYS

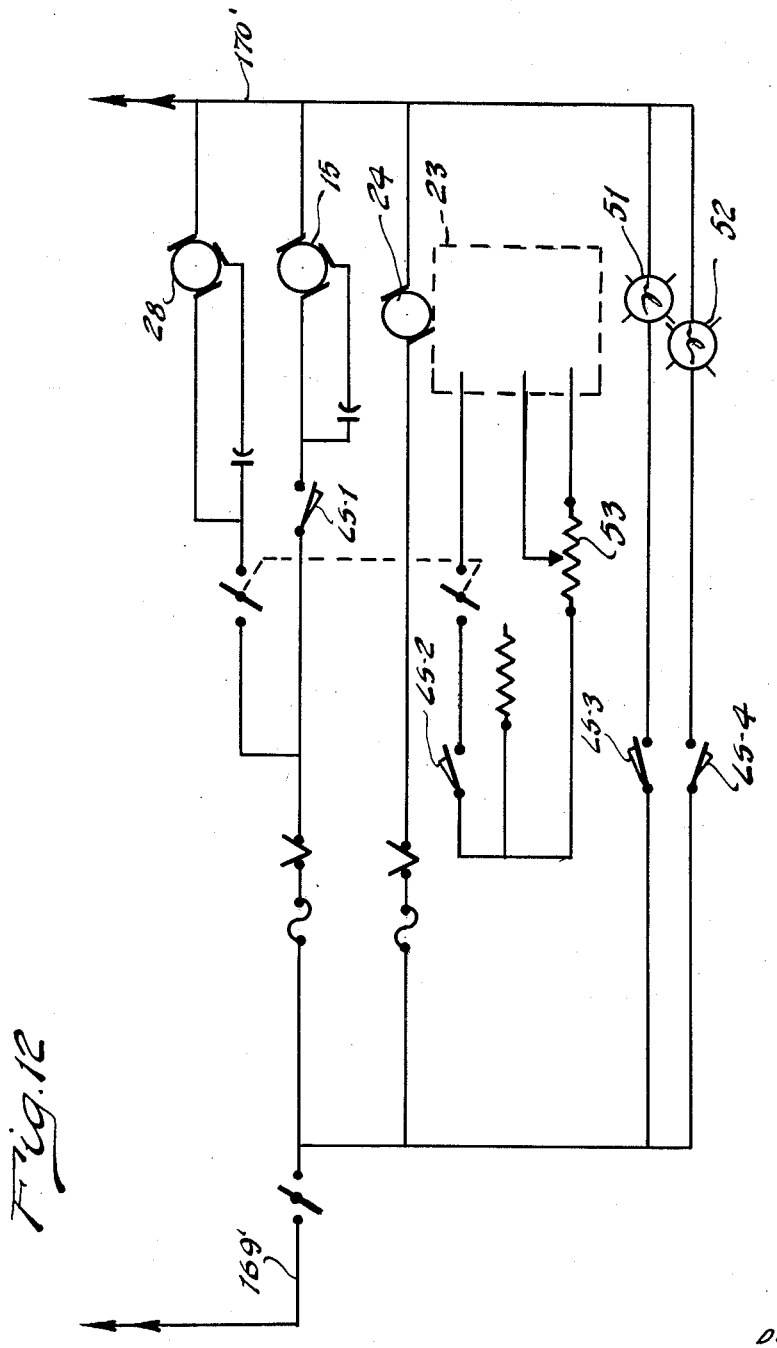

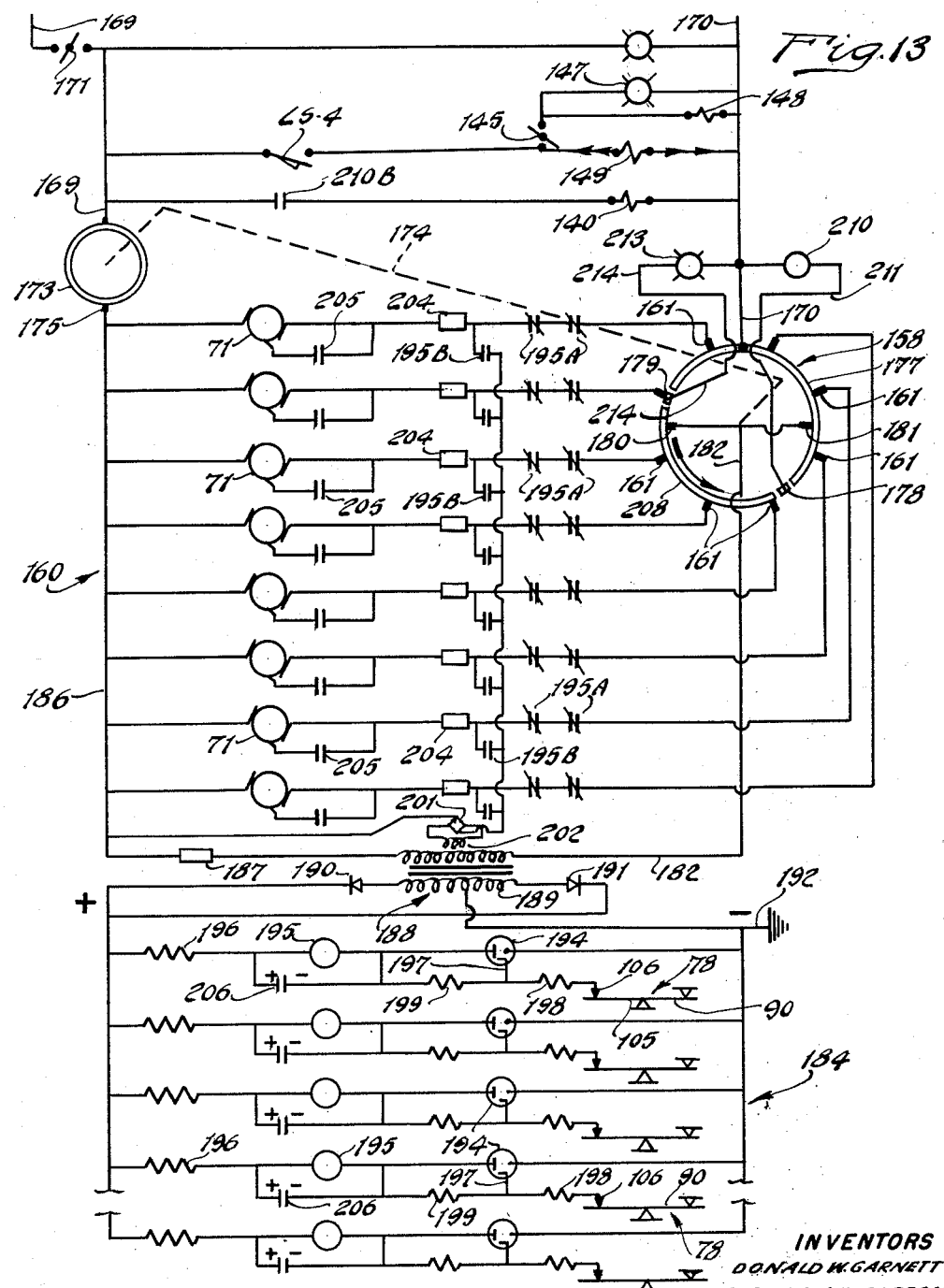

United States Patent Office 3,094,182
Patented June 18, 1963

3,094,182
MATERIAL FEEDING AND WEIGHING
APPARATUS
Donald W. Garnett, Grand Ledge, and Gustav A. Olofsson, Lansing, Mich., assignors to The Olofsson Corporation, Lansing, Mich., a corporation of Michigan
Filed June 29, 1959, Ser. No. 823,385
28 Claims. (Cl. 177—1)

The present invention deals with an improved method and automatic machine for weighing and discharging weighed amounts of bulk materials at high speed, at equal timed intervals and with a high degree of accuracy.

In general, the invention affords an improved method and apparatus for weighing discrete materials in accordance with a novel principle of rapidly overfilling by a slight amount each of a series of weighing receptacles in endless travel, in which means has been provided to feed off a portion of this material at a slow rate in uninterrupted flow as the receptacle traverses its path, until the weight of the charge reduces to the desired amount. The amount of material fed to the receptacle at an initial filling station need only be accurate to the extent that the amount be somewhat more than required, resulting in the ability to rapidly fill the series of weighing receptacles from a single initial supply source, under which the weighing receptacles move in endless and rapid succession.

In these general respects the present method and apparatus differ from what is shown in the copending application of Gustav A. Olofsson and Donald W. Garnett, Serial No. 545,246, filed November 7, 1955, now Patent No. 3,020,966, in which the principle of operation is to progressively build up the weight of a charge at successive filling stations; and the present invention is therefore to be considered a substantial departure from that of the identified application.

A further general object is to provide a weighing and dispensing method and apparatus, in accordance with which an unlimited number of weighing receptacles can be grouped in a traveling series, these receptacles all simultaneously feeding off material at a fine feed rate until each individual weighing receptacle has reduced its weight to the preset amount. High speed weighing thus is possible, combined with a fine feed rate to give a high degree of accuracy.

The principle of operation underlying the invention permits avoiding possible difficulty in splitting the discharge from a single original feed source into multiple paths, and the attendant possibility in some cases of one feed path running empty and another overfilling, unless attention is paid to adjustment. Further, the method and apparatus of the invention, avoiding as they do the intermittent flow characteristic of the successive feeders, and resultant interrupted movement of the weighing mechanism at successive feeding stations, are free from a tendency toward an inherent lag in signaling in response to the weight of material in the receptacles.

Presently available commercial weighing machines designed for high speed operation commonly feature a discharge of weighed charges at unequal time intervals, dependent on the rate of supply to the weigher. Consequently, time intervals between discharge of weighed charges vary greatly. There results an undue complication for the packaging apparatus usually associated with the weigher, which must operate at varying rates as dictated by the weigher discharge. This is obviously highly undesirable.

In accordance with the general objects of the invention stated above, we provide an improved apparatus comprising a traveling series of spaced weighing receptacles, these being also of improved type, which are successively supplied with a pre-set excess amount of the material to be weighed and are brought to accurate weight under the principle of gradual diminution of the original charge. They travel in an endless path, preferably without diminution of their speed of movement, past a single material feeding device, of improved type, and past a discharge station to which they empty at equally spaced time intervals.

In further accordance with the invention, each weighing receptacle is provided with a feed-off means by which overweight material is removed at a fine rate of feed until the desired weight is reached. Since several of the weighing receptacles are feeding off at the same time, high production rate of accurate charges is possible.

Another object is to provide apparatus having weighing receptacles equipped with individual feed-off means, in which an operating connection between the weighing receptacle and its feed-off device stops the feed-off action when the desired weight is reached. After this the receptacle awaits its turn in traveling and is automatically dumped, in succession and equal timing with the other receptacles of the series, to a suitable receiver, preferably in the form of a chute leading to a container to be filled in packaging.

Thus, the receptacles, having fed-off in the proper time cycle, unfailingly discharge at equally timed intervals to the receiver, enabling the packaging apparatus to operate continuously. It is also seen that the possibility of wastage, represented by material falling into the weighing receptacle after the same has signaled completion of weight, is eliminated. The possibility of dispensing even a slight underweight charge is also eliminated or greatly reduced, due to the fine feed-off rate.

Still more specifically, it is an object of the invention to provide a machine for weighing bulk materials at high speed which is accurate and automatic in all phases of its operation; and which further has improved means whereby, in the event that a desired accurate weight is not delivered to each receptacle, packaging of this charge is prevented. This is done by forwarding an appropriate signal to a memory device, which in turn and at the proper time feeds a signal to the packaging receiver.

Further in accordance with this object, provision is made that, in the event that the feed-off device of a receptacle is unable to reduce the overweight charge by the time the weighing receptacle reaches its discharge position, an appropriate signal is also fed to the packaging receiver or operator, as desired.

It is an object of the invention to provide an improved method by which weighed charges are gently discharged with a minimum of shock being imparted to the multiple weighing mechanisms and a minimum of breakage of fragile product, such as potato chips.

The improved machine also features improved automatic material supply provisions whereby the initial or main feed of the bulk material is uniform in rate. For this purpose a main feeder is provided which comprises a weighing chute across which the bulk material passes continuously and at a uniform rate. If the weight of material passing over the weighing chute falls below a pre-set amount a speed-up signal is sent to a supply elevator which supplies the main feeder. By the same token, if the weight of the material passing over the weighing chute increases above a preset amount a slow-down signal is sent to the supply elevator.

The main feeder also features a signaling means whereby the machine operator is warned if the weight of material on the weighing chute falls below or rises above an acceptable preset range of weights. In further detail, the main feeder also has provisions which enable it to even out variations in flow rate which are of short duration; and has further provisions to separate bulk material into more discrete units, that is, to disengage particles that are interlocked, so that discharge to the weighing receptacles will be a continuous flow of separated particles.

The improved machine is also characterized by a simple type means whereby the material fed off the weighing receptacles while feeding down to weight is returned and mixed with the incoming supply and is thereby returned to be weighed and processed again.

The foregoing as well as other objects and advantages will be made more apparent as this description proceeds, especially when considered in connection with the accompanying drawings, wherein:

FIG. 1A is a perspective view from another overhead angle illustrating the main supply feeder in relation to the traveling weighing receptacles, one of which is shown in material dumping position;

FIG. 1B is a fragmentary perspective view from beneath of the receptacle and receptacle weighing apparatus of the machine;

FIG. 2 is a side elevational view, partially broken away, of the main supply feeder;

FIG. 3 is a fragmentary view in vertical section along line 3—3 of FIG. 2, being in enlarged scale;

FIG. 4 is a top plan view, partially broken away, of the main supply feeder, a trough receiver thereof being omitted for clarity but the mounting members for the receiver being indicated in dot-dash line;

FIG. 5 is a vertical sectional view along line 5—5 of FIGS. 2 and 4, being in enlarged scale;

FIG. 6 is a view in vertical section on line 6—6 of FIGS. 2 and 4;

FIG. 7 is a fragmentary plan view, partially broken away, illustrating the general relationship of parts of the rotating weigher unit proper;

FIG. 10 is an elevational view of the structure of FIG. 9, being fragmentary in nature;

FIG. 11 is an elevational view of a control box as applied to the weigher unit;

FIG. 12 is a schematic wiring diagram of a composite nature depicting an electrical control system for the material feed-in apparatus and main supply feeder; and FIG. 13 is a schematic wiring diagram depicting an electrical control system for the weigher unit proper.

*The Machine and Its Operation in General*

Figure 1:
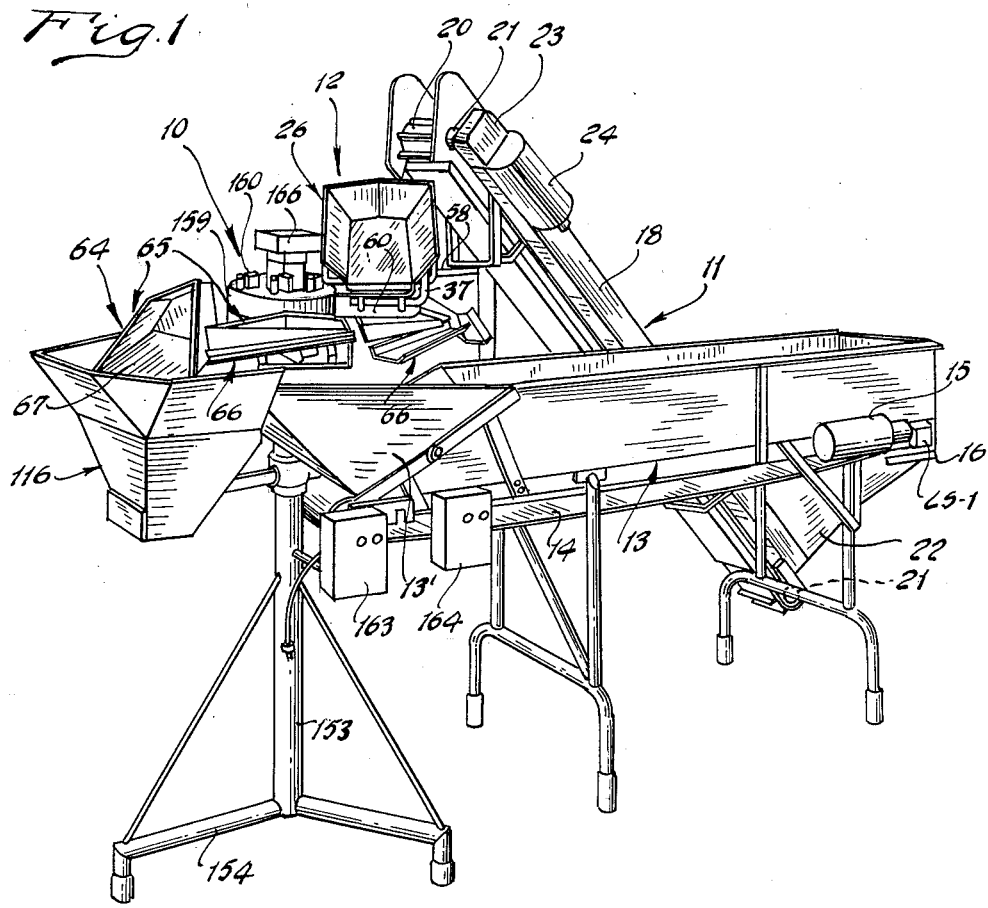
FIG. 1 is a perspective view from one angle illustrating the improved weighing machine in a general way, including the weighing unit proper, the main supply feeder, supply elevator, and supply bin or hopper.

In general, and as illustrated in FIGS. 1, 1A and 1B, the apparatus essentially comprises a supply bin or hopper intermittently feeding a weight sensitive dump chute so as to maintain a supply of material therein, the chute in turn feeding the lower end of an inclined elevator. This elevator in turn supplies, and is speed-responsive to the requirements of, a vibratory main supply chute mounted above a horizontally weighing mechanism, thereby delivering bulk material at a uniform rate and in succession to a series of weighing receptacles of that mechanism, which are driven continuously by it in a horizontal rotative path. Each receptacle is mounted on a weighing device, and is constituted by two parts, one of which receives the bulk of the charge as delivered by the main supply chute; and the other of which receives a lesser amount of the material, and is provided with a vibrating device enabling the material thereon to be fed off at a fine rate to reduce the excess initial charge.

Appropriate electrical means govern the signaling of weight to the supply means and the vibration of the feedoff part of the receptacle, until the overall weight in the composite individual receptacle is reduced accurately to the preset desired weight. That is, as the individual receptacle passes beyond the initial filling position, its weighing device signals the presence of excess material by closing an electrical contact, upon which the associated receptacle vibrator is powered, through appropriate circuitry and components, to commence to reduce the existing and intended excess in weight.

If the receptacle should not receive at the outset an excess of bulk material, no excess weight signal will be originated, and the existence of an underweight charge will be signalled, and the packaging operator or apparatus will be signalled in regard to the condition. Such signal may be used to cause diversion of the discharge of the underweight receptacle to an alternate disposal point other than that for normal packaging, or may be transmitted via a suitable memory device to prevent the packaging machine from picking a bag or other receptacle from a magazine, thus resulting in the underweight charge being emptied into an alternate receptacle below the packaging station. If proper weight is present, no signal is fed the packaging operation.

In accordance with the invention, the feed-off device of the receptacle consists of a small electric motor rotating an eccentric weight and directly mounted to the bottom of a feed-off part of the receptacle, whereby vibration under rapid rotation of the eccentric weight causes the material thereon to move gravitationally in a fine stream along the part toward its lower discharge end. When a proper weight is reached, the vibratory motor is de-energized and dynamically braked quickly to a halt, in order that a minimum of further material will leave the vibrated receptacle. In actual practice, the receptacle weighing devices are preset above the desired weight by a slight amount to compensate for this very slight overfeed. Normally the receptacle completes this vibration down to weight before it reaches its discharge position, and, as indicated above, simply awaits its turn to discharge in succession with the other receptacles of the series.

The discharge is accomplished by tipping the composite receptacle and its weighing device approximately 90°, and inclined sides on the receptacles facilitate gravitational discharge. Provisions for tipping of the weigher receptacles include a shaft and gear arrangement to be later described in detail, and upon discharge the receptacle passes the main feed chutee to receive a further charge for its next cycle.

Referring to FIGS. 1, 1A and 1B, the reference numeral 10 generally designates the basic rotative weighing unit or mechanism of the improved machine, the reference numeral 11 generally designates an elevator type, bin-supplied feed-in apparatus for bulk discrete material, such as potato chips, by which a main chute-type supply feeder and weigher, designated 12, is continuously supplied, which chute 12 in turn supplies the weighing unit or apparatus 10. The weighing unit 10, feed-in device 11 and main supply unit 12 are closely correlated in their operation, as will appear from the description to follow, particularly in regard to the attainment of a correct supply rate of feed, as required by the weigher and by the return of excess material to the supply system under the novel principle of the invention.

The elevator feed-in unit 11 receives material from a suitable large bin 13, the bottom of which is constituted by an appropriate conveyor belt 14 powered by a small electric motor 15. The belt 14 may be advanced periodically by this means to dump potato chips into a weight-sensitive dump chute 16 at an end of bin 13, which dump chute is equipped with a limit switch LS1. As the weight of the chips in the dump chute 16 increases, the latter tips downward, opening an electrical circuit through the limit switch LS1 to the electric motor 15, and thus stopping travel of the bin belt 14. The supply bin 13 is also provided with a receiving chute 13' at its opposite end, so positioned and shaped to receive excess discharge from the weighing unit 10.

The feed-in unit 11 comprises an upwardly inclined, trough-shaped housing 18, the bottom of which is constituted by an endless cleated belt 20 trained about end pulleys 21. The lower end of the elevator housing 18 includes a small hopper 22 which receives material gravitationally as its slides from dump chute 16. The elevator feeder or chute 11 discharges at its top to the main feeder 12, the cleated elevator belt 20 being driven, under control of an eddy current clutch 23, by a driving motor 24. This arrangement of bin, belt and chute components is generally similar to that described in the above identified Olofsson application, to which reference may be made.

The Main Feed Mechanism

The main feeder 12 referred to above embodies, as shown in FIGS. 2 and 4, a trough-like receiver 26 which is given an agitated vibratory motion by a rotating eccentric weight 27 mounted on the shaft of and driven by a small electric motor 28, which motor is attached by a tubular cradle 29 to the bottom of receiver 26. Receiver 26 is mounted on top of a set of four vibration isolators 30, best shown in FIG. 3. These vibration isolators are each preferably constructed of a U-shaped section of resilient material, having a vibration dampening characteristic, such as butyl rubber. The lower end of each is mounted on a platform 31 paralleling receiver 26; and flexible electrical wires (not shown) are employed to carry electrical power to the motor 28, while allowing freedom of movement of the feeder unit 12 as it vibrates and moves up and down above the weighing unit or mechanism 10.

The platform 31 is tiltable on the weighing mechanism in order to provide an adjustable feed rate of material as it gravitationally flows, assisted by vibration, along the inclined trough receiver 26.

To this end, and as also illustrated in FIGS. 2 and 4, an elongated weigher beam 33 of generally U-shaped outline in plan (FIG. 4) is pivotally supported intermediate its ends, as by nylon bearings 34 on its forward arms 33′, on a transverse weigher base element 35 attached to a main, laterally adjustable feeder base member 36. The latter is in turn supported above weigher unit 10 on a tubular frame piece 37 extending forwardly of receiver 26. A fixed arm 38 extends upwardly through beam 33 from fixed base member 36, and a calibrated and accurately adjustable turnbuckle device 39 has its rear end pivoted at 40 to the top of arm 38. The forward end of the turnbuckle 40 is pivoted at 41 to the top of a swinging arm 42, the lower end of which arm is pivoted by nylon bearings 43 to the forward end of the arms 33′ of weigher beam 33. As shown in FIG. 4, these bearings are at the ends of a transverse horizontal and integral extension 42′ of the swingable arm 42; and the integral extension or cross part 42′ is fixedly secured to the bottom of the platform 31, upon which the receiver or trough member 26 of the chute unit 12 is mounted through the agency of the vibration isolators 30. Thus the parts 38, 39 and 42, 42′ constitute a linkage, generally designated 44, by which the inclination of the receiver 26 in a vertical plane, relative to the supporting frame piece 37, may be adjusted finely, with the receiver pivotally supported on the forward end of weigher beam 33.

A heavy, solid cross sectional area 45 at the rearward end of weigher beam 33 provides a counterbalancing effect to oppose the weight of the main feeder structure, generally consisting of the receiver 26, motor 28, cradle 29, frame piece 37 and platform 31. A tare weight 46 is mounted on weigher beam 33 for the adjustment of its counterbalancing. This is done by means of adjustment of the tare weight 46 along the depressions 47 on weigher beam 33, thereby to adjust the depth of product on receiver 26.

Provisions for initiating electrical signals as to the condition of balance due to the weight of material in the receiver trough 26 includes three limit switches LS2, LS3 and LS4 mounted in a housing 49 located beneath weigher beam rear projection 45. Housing 49 is attached to the side of the main feeder base 36. Adjustable set screws 50 provide for consecutive operation of limit switches LS3, LS2, and LS4, in that order, as the weight of material in receiver trough 26 increases from less than a balanced condition of its weigher mechanism to an overbalanced condition.

Initially, in the condition in which less material is present than is required for balance, all limit switches LS2, LS3 and LS4 are operated. Limit switch LS3 (normally open) then has a closed circuit to a suitable signal light 51 (see FIG. 12) which warns the operator of insufficient material in the receiver trough 26. Limit switch LS2 (normally open) also has a closed circuit through which the eddy current clutch 33 of the supply elevator 11 (FIG. 1) is caused to operate at the higher of two speeds. Limit switch LS4 (normally closed) has, in the condition in question, only an open circuit.

Assuming the weight of material in the receiver trough 26 increases due to the high speed operation of the supply elevator 11, a second condition of balance is reached in which movement of the weigher beam end 45 upwardly releases limit switch LS3, thus opening the circuit to the warning signal light 51. This indicates the weight of material moving across the receiver trough 26 of main feeder 12 is in a satisfactory range.

Assuming the weight of material in the receiver trough 26 continues to increase, a third condition of balance is reached where movement of the weigher beam end 45 upwardly releases limit switch LS2, thus opening the circuit, causing the supply elevator 11 to drop its speed. Assuming again that the elevator 11 still continues to supply excessive material, the weight of material in the receiver trough 26 will continue to increase until a fourth condition of balance is reached in which upward movement of the weigher beam end 45 releases limit switch LS4, closing an electrical circuit to signal light 52 (FIG. 12), which warns the operator of the presence of excessive material in receiver trough 26.

As guided by the two signal lights 51, 52, the operator can quickly and easily adjust a suitable rheostat 53 in the circuit of FIG. 12 to a setting at which the operation of the elevator 11 will supply slightly more than enough material to maintain the correct flow rate of material on trough receiver 26 and the low speed operation of the elevator will supply slightly less than enough material to maintain correct flow. Since limit switch LS3 operates in the middle range of balance conditions (second and third as described above), it is seen that the supply unit 12 is capable of automatically correcting its rate of delivery to maintain an acceptable weight of material, normally without further attention from the operator.

The material forwarded from the supply elevator 11 by its cleated belt 20 is by nature somewhat clumpy, i.e., of an uneven, somewhat packed condition, to an extent that the high-low speed operation of the elevator can only partially level out. Provisions for the agitated vibration of the receiver trough 26, as described above, are therefore effective to vibrate and level off compacted zones or areas in the bulk flow of material and to fill in low density zones or areas in the flow as it gravitationally approaches the discharge end of the main feeder 12.

It will be noted that the position of the eccentric weighted motor 28 is closer to the discharge end of the trough receiver 26 than to the rear end of the latter. This causes a higher feed rate at the discharge end than at the rear end, resulting in a thin discharge flow of fast moving product, intensely agitated to facilitate separation of discrete particles. They thus leave the discharge end of the main feeder 12 in a uniform flow for delivery to the weighing mechanism 10.

Provision is also made in the main feeder base member 36 (FIGS. 2 and 4) for laterally varying the position of discharge of receiver 26 over the rotative weigher 10, as required. For this purpose feeder base 36 is pivotally mounted at its rear end, as at 54, to a fixed swivel plate 55. This swivel plate has an arcuate locking slot 56 at its forward end to receive a locking bolt and wing nut 57, by which the main feeder 12 is held in the desired position of lateral adjustment relative to weigher 10. Swivel plate 55 is fixedly mounted to a bracket or projection 58 on the housing framework of the elevator, as shown in FIGS. 1 and 1A.

There is preferably provided, at the discharge end of the receiver trough 26, a baffle plate 60 so positioned and inclined as to intercept the flow of material from the main feeder 12 and deflect the material slightly back under the receiver trough 26. This is in order to give the material a velocity in the direction of movement of the composite weighing receptacles (to be described) of weigher 10, aiding the filling action of the receptacles. Baffle plate 60 is secured on the forwardly extended frame piece 37 carried by the main receiver weigher base 36, also shown in FIGS. 2 and 4.

The Weighing Mechanism

As best shown in FIGS. 1A, 1B, 7, 8 and 9, the composite or two-part weighing receptacles referred to above, each generally designated 64, are arranged in a circular array, and are driven continuously in a horizontal rotative path which passes beneath discharge end of main feeder 12, thereby receiving material discharged gavitationally from the latter. Each composite weighing receptacle comprises a large size bulk receiving pan 65 and a smaller vibrating feed-off pan 66 radially outwardly thereof. Each bulk receiving pan 65 is in the form of an open box, the pans being shaped in an irregular outline so as to nest in the circular array. Each has an outer wall 67 inclined upwardly and outwardly from its bottom 68 to aid discharge of material therefrom when it is tipped into a vertical position, in a way to be described. Bulk receiving pans 65 are each attached to the top of and supported by one of an annular series of skeleton weigher platforms 69 of charge weighing mechanisms to be described. Each feed-off pan 66 of the same composite receptacle 64 is also resiliently and more indirectly attached to and supported by the same weigher platform 69.

Figure 8:
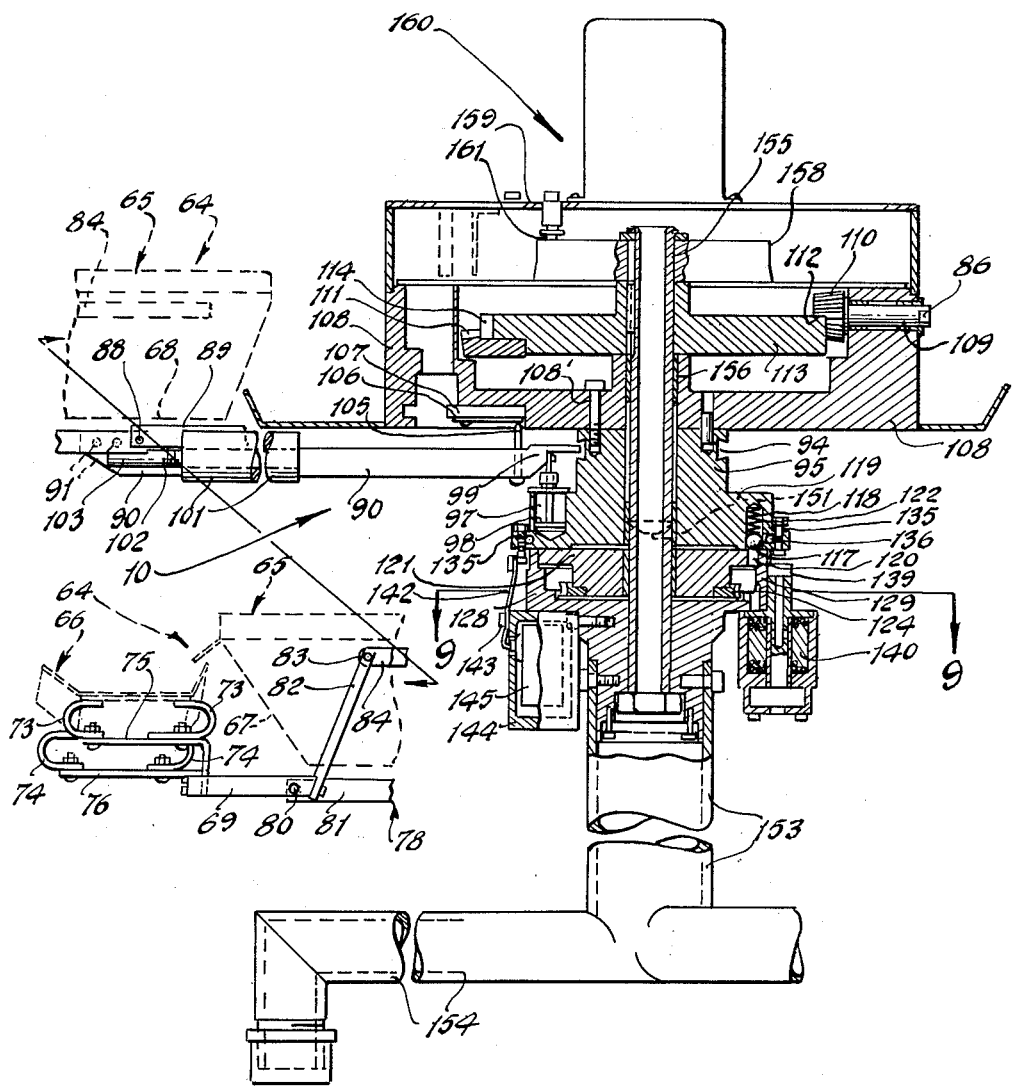
FIG. 8 is a fragmentary view in vertical section along broken line 8—8 of FIG. 7.

The pans 65, 66 are shown in dotted line in FIG. 8 in relation to the platform, and in FIG. 7 only a single feed-off pan 66 appears, in order not to obstruct a view of the receptacle weighing equipment.

The feed-off pan 66 is in the form of a relatively shallow, trough-like, open-ended tray, inclined slightly downward and backward as regards the direction of movement of the weigher receptacles 64; which is indicated by an arrow in FIG. 1A. As shown in that figure and FIG. 1B, a small electric motor 71 having on its shaft a weighted eccentric 72 is attached to the underside of each feed-off pan 66. The feed-off pan is in turn supported by four vibration isolators 73, 74, as shown in FIGS. 1B, 7 and 8 (similar to those of the main feed unit 12, FIGS. 2, 3 and 4), which are also preferably formed of a suitable resilient material such as butyl rubber. The isolators 73, 74 are in turn supported respectively on brackets 75, 76 fixed on and radially projecting from the associated weigher platform 69.

The discharge of the main supply feeder 12 is so positioned radially outward over the weigher receptacles 64 (by means previously described) as to give a desired division of material, such that the large portion of the material is received by the inner bulk receiving pan 65 and a smaller portion is received by the outer feed-off pan 66. Flexible electric conductors 79 to the motor 71 allow freedom of movement for vibration, weighing and discharge.

Operation of the motor with its weighted eccentric 72 causes an agitation and vibration to be imparted to the inclined feed-off pan 66, causing a gravitational flow of material lying therein towards its rear discharge lip 77. Material discharged here is received by the chute receiver end 13' of the supply bin or hopper 13 for return into the main supply system in the manner described above.

Since both pans 65, 66 of the composite receiver 64, and the contents thereof, are supported in common by a single weigher mechanism, generally designated 78, the total of the combined charges constitutes a single weighed charge which will be discharged to a packaging apparatus or operation, as hereinafter described.

Each of the several identical charge weighing mechanisms 78 comprises one of the skeleton weigher platforms 69, which is pivotally mounted at aligned spaced points 80 to a weigher beam 81, and an upward projecting arm 82 is attached to the weigher platform 69. Arm 82 has its upper end pivotally connected at 83 to a connecting link 84, which extends horizontally inward radially to a pivotal connection at 85 (FIG. 7) with a crank 86.

Weigher beam 81 has its inner radial end pivotally connected at aligned pivots 88 to a radial weigher base 89, for a purpose to be described, and an inwardly extending tare bar 90 is attached to the inner end of weigher beam 81, as by screws 91. Tare bar 90 is calibrated and provided with suitably spaced detent notches and calibration to receive a tare weight 93. The innermost end of tare bar 90 is received radially within a groove 94 (FIG. 8) of an upright rotary hub 95, which groove limits the vertical travel of the weigher mechanism. Provision is made for dampening vibration out of the weighing mechanism, preferably by means of an oil-filled dashpot 97 formed as an integral part of rotatable hub 95, the function of the latter to be described. Dashpot 97 receives a loosely fitted piston 98 pivotally attached at its upper end at 99 to tare bar 90.

Provision is also made to balance the weighing mechanism to an equilibrium condition when tare weight 93 is placed on a zero calibration. This is the function of a counterweight 101 rotatably mounted on a threaded stud 102 attached to weigher beam 81 at 103. Rotation of the counterweight 101 gives it a fine movement in or out for balancing the weigher.

As illustrated in FIGS. 7 and 8, the innermost end of tare bar 90 is equipped with a fixed upward projecting electrical contact pin or member 105 contacting a flexible leaf spring 106 mounted on an insulated block 107 fixed to the rotating hub 95, the two parts 105, 106 together constituting contacts of an electrical swich.

The linkages and pivoal connections thus far described constitute a weighing mechanism capable of electrically signaling an overbalanced condition, in which the weight of material in the composite receptacle is sufficient to overbalance the tare weight 93, in a preset position of the latter, and thereby close an electrical circuit through pin and spring contacts 105 and 106. Similarly, an underbalanced condition is signalled when the electrical circuit through contacts 105, 106 is opened by the tare weight 93.

Each of the radial weigher bases 89, pivoted at 88 to a weigher beam 81 as described, is attached at its inner end to a horizontally rotatable drum-like body 108 and is carried therewith in its endless rotation. Body 108 is coaxially fixed by studs 108' to hub 95, and provides a rotatable journal connection for each of a circumferential series of radial bevel pinion shafts 109, FIGS. 7 and 8, each carrying one of the cranks 86 previously described at its outer end. The shafts have bevel pinions 110 at their inner ends which are of modified or mutilated type and are adapted to mesh at certain times with a bevel gear segment 111 of partial ring outline, shown in FIG. 8.

In accordance with the invention (FIG. 8), the bevel pinions 109 are each notched at 112, i.e., axially from its inner end and along a diameter, so as to be adapted to slidably engage at the notch 112 over the top of a fixed horizontal plate or disk 113, and thereby be held in a non-rotatable or locked condition, with the crank 86 disposed horizontal and away from its associated weighing linkage including connecting rod or link 84. This condition obtains during a major portion of the rotation of the body 108.

Fixed plate 113 is provided with a circumferentially extending partial groove or notch 114 at a position at which tipping of the weigher platform 69 is desired to cause discharge of the material lying within the composite receptacle 64; and it is at this circumferential notch zone that the bevel gear segment 111 is secured to the plate bottom.

Thus rotation of hub 95 and body 108 carries modified bevel pinion 110 into mesh with the partial gear sector 111 at the zone in question, causing one revolution of the pinion before the diametral pinion notch 112 is again brought into a flush and locked-up sliding engagement with the top plate 113. As pinion 110 makes its single revolution the crank 86 causes a radial outward and return motion of connecting link 84, so as to cause a partial rotation of weigher platform 69 about its aligned pivots 80 to a vertical position.

This occurs at a discharge receiving funnel or hopper 116 of the machine (FIGS. 1 and 1A), and results in a gravitational discharge of material lying within pans 65, 66 of the composite receptacle 64 to funnel 116, which directs the weighed charge to a suitable packaging apparatus or operation (not shown).

Since an entire weighing cycle can be utilized for the discharge action, the transfer of material from weighing receptacle 64 may be very gentle, which is important in the handling of fragile material such as potato chips, as to which breakage might be a problem. Also, since the start and stop of rotation of the pinion 110 by crank 86 involves very little inertia, there is very little shock transferred to the other weighing mechanisms of the series.

*Weigher Operating Apparatus*

Figure 9:
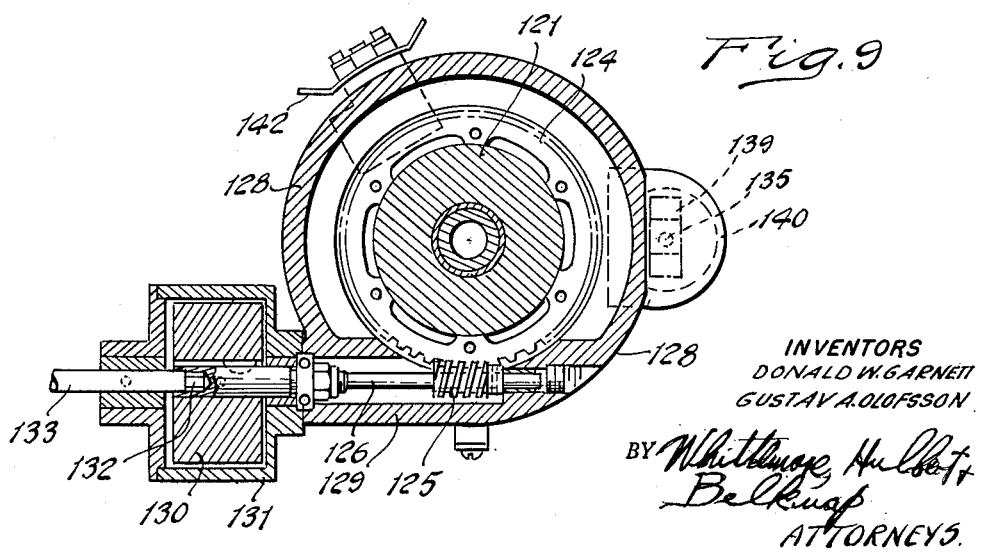
FIG. 9 is a view in horizontal section along a line generally corresponding to line 9—9 of FIG. 8.

Referring to FIGS. 8 and 9, the rotatable hub 95 of the weigher unit 10, carrying body 108 for rotation therewith, has a detent clutch type of drive, comprising a plurality of circumferentially spaced balls 117, each contained within a vertical hole 118 opening upwardly in a bottom flange 119 of hub 95 and urged downward against a seat provided by one of a series of smaller holes 120 in a driving plate 121 beneath the hub, as by a compression spring 122. Thus any obstruction in the path of rotation of the weighing receptacles 64 will increase the torque requirement of the drive plate 121, causing balls 117 to rise out of driving contact with holes 120.

Driving plate 121 has fixedly mounted thereon a worm gear 124 in mesh with a driving worm 125, as shown in FIG. 9, which worm is on a shaft 126 journalled in a fixed gear housing 128, within a upright flange 129 of which the drive plate 121 and worm gear 124 operate. The outer end of shaft 126 projects outwardly of housing 128, and carries a small fly wheel 130, which rotates in a housing extension 131 applied to gear housing 128.

The outer end of shaft 126 may be driven by a suitably rated electric motor (not shown), but is preferably formed at 132 to receive and be driven by a flexible shaft 133 driven from a packaging apparatus (not shown) in properly timed relation thereto.

Flywheel 130 absorbs any torsional variations in such a driving arrangement, giving a very uniform drive motion free of shock which might affect the accurate weighing mechanism.

It will thus be seen that packaging apparatus may be associated with the machine, which is continuous in its operation and performs at a constant speed, without having to resort to start and stop operation, as might be required if associated with a weighing mechanism having an uneven output time. Such types are in commercial use at present.

*Control Equipment*

As shown in FIG. 8, the rotatable hub 95 is provided with multiple, circumferentially spaced memory devices, each comprising a pin 135 slidably fitted in a vertical hole in an outer rim of the hub flange 119. These pins are detent-held in whatever position they are placed (by mechanism to be described) by a ball 136 urged outward against a groove in the pin 135 by a radial compression spring. Positioned below the rotative path of the pins 135 is a striker head 139 mounted on the plunger of a solenoid 140 (also see FIG. 13).

Following the filling action of the weigher receptacle, as above described, the weigher pin and spring-type contacts 105, 106 are closed, completing an electrical circuit which (through relay and commutator provisions to be later described) causes current to flow through the coil of solenoid 140, in turn causing the solenoid striker head 139 to move upward. This forces a memory pin 135 of the series of pins to its upper position. Continued rotation of the hub 95 brings the operated pin 135 into a position above and just clearing a limit switch lever 142, which is pivotally mounted at 143 on a fixed housing 144 in which a switch 145 is disposed.

Assuming that too little material was fed into the weigher receptacle 64 during the filling cycle and that the latter is therefore underweight, the tare bar 90 of the weighing mechanism in question would not have closed the electrical circuit through contacts 105 and 106. Consequently solenoid 140 would not have been energized and the memory pin 135 of the corresponding weigher would be in its down position. In this condition as the pin is brought into the zone of limit switch lever 142 (left side of FIG. 8) it will cam and cause the lever to pivot, thus closing a circuit through limit switch 145.

As illustrated in FIG. 13, this illuminates a signal lamp 147 and/or sounds a buzzer 148, warning the attendant at a subsequent packaging apparatus or operation in timed relation to the packaging cycle. Thus, it is possible to prevent packaging of this underweight charge. An underweight solenoid 149 may be wired in the circuit in series with underweight limit switch LS4 to halt the packaging apparatus (not shown) if desired (FIG. 13).

As the pins 135 continue their rotation, a fixed cam 151 (FIG. 8) causes all pins to be returned to their lowermost position in preparation for a new cycle.

All rotating parts of the weigher unit 10 are mounted on an upright tubular base pedestal 153 supported by an appropriate base or footing 154. At its upper end pedestal 153 carries a stationary, vertically extending hollow shaft 155 about which the rotating parts are journalled, as by a suitable sleeve bearings 156.

The fixedly mounted shaft 155 carries, near its upper end, the fixed disk or plate 113 previously described, and at its extreme upper end a commutator disk 158 is secured in fixed relationship thereto. Electrical connections (not shown) to the commutator 158 may be made through the hollow center of shaft 155.

The rotatable body 108 previously described is provided on its top with a mating housing 159 encasing the commutator 158, and on which are mounted various rotating electrical components, generally indicated 160, including multiple brush holders and brushes 161 in a slidable contact with the commutator 158, whose general arrangement is seen in FIG. 13. As shown in FIGS. 1 and 11, other fixedly mounted electrical components may be contained within suitable enclosures, for example the control and switch boxes 163, 164 as mounted by bracket extensions 165 to the pedestal 153, or to a side of the framework for the supply bin or hopper 13, as shown in FIG. 1; and a master control unit 166 may be mounted atop the commutator housing 159.

Control Circuitry

Now referring especially to FIG. 13 in reference to electrical structure and circuitry, standard 110 volt alternating electric current is applied to supply leads 169, 170, and manual closure of a weigher on-off switch 171 energizes the various electrical devices of the weigher circuit of FIG. 13, which for simplicity are indicated by conventional symbols accepted in the electrical art. Also for simplicity, the contacts of relays are numbered to correspond with their coils, with letters distinguishing multiple contacts responding to a single coil from one another.

As depicted schematically in FIG. 13, one supply lead 169 is wired to a slip ring which is actually a part of the commutator 158, hence is shown schematically coupled, as to its true coaxially driven relation to the commutator, by the gang connection 174. An electrical connection is made to brush 175 in sliding contact with slip ring 173 which supplies electric power continuously to the rotating electrical components 160.

The other power lead 170 is wired to a circumferentially elongated conducting segment 177 of the composite commutator 158, which the multiple brushes 161 intermittently contact. These brushes also intermittently contact the conducting segments 178, a short segment insulated from and just preceding segment 177, and a further short segment 179 following segment 177 and insulated therefrom.

There are also provided two brushes 180 and 181 so spaced and connected electrically that in combination they maintain a continuous electrical contact with the elongated segment 177. A lead 182 taps into the connection between brushes 180, 181 to supply continuous power to certain electronic devices of the control circuitry of FIG. 13, which is designated 184. These devices are wired in eight circuits, one for each weighing receptacle, which are identical, wherefore only one thereof will be herein described. The same procedure will be followed in reference to the identical rotating components 160. Electric power is applied, in a circuit including slip ring 173, its brush 175, a brush lead 186, a protective fuse, the lead 182, brushes 180, 181 and commutator segment 177, to the primary winding of an isolation transformer 188. A power output from a center-tapped secondary winding 189 of this transformer is rectified to direct current through silicon rectifiers 190, 191 and applied to the eight identical electronic circuits 184. The negative circuit is grounded at 192 to the rotating structure, which acts as one conductor for the signal circuit through pin and spring contacts 105 and 106.

Each of the eight electronic circuits includes, in series, a cold cathode tube 194, a control relay 195 (having contacts 195A and 195B) and a protective resistor 196, which circuit is completed when the voltage applied to starter electrode 197 of the cold cathode tube 194 is of a proper value to cause the tube to conduct. The necessary signal voltage to the starter electrode 197 is provided by a bias resistor circuit through beam controlled contacts 105, 106, including two high ohmage resistors 198, 199. These are of suitable value to drop the signal voltage below a potential at which the tube will conduct upon closure of a circuit through contacts 105 and 106, under an overweight condition in weigher receptacle 64, as previously described.

Interrupting of the cold cathode circuit results in de-energization of control relay 195 and, if the brush 161 of the rotating weigher component is in contact with the small commutator segment 178, a circuit will be completed through the normally closed contacts 195A of relay 195, and through the vibratory motor 71 of the associated feed-off pan 66. This will result in a feed-off of material from weigher receptacle 64, also as previously described.

As motor 71 continues to operate a condition of underbalance will be reached in which contacts 105, 106 will separate, thus applying a high positive signal voltage to starter electrode 197 of cold cathode tube 194, and causing conduction therethrough to energize control relay 195. This opens contacts 195A and in turn causes opening of the alternating current circuit powering motor 71.

Further provisions are made for the dynamic braking of motor 71 to a stop by the use of a full wave rectifier 201 in combination with another secondary winding 202 of transformer 188 and a normally open contact 195B of relay 195. Closing of contact 195B upon energization of relay 195 completes a circuit to supply direct current for dynamically braking vibratory motor 71 to a quick stop.

Protection for the motor is supplied by a fuse 204; and a suitable capacitor 205 supplies the necessary phase change for the small motor 71, which is a small capacitor-run type. An additional capacitor 206 in the electronic circuit 184 provides filtering effect on any direct current pulsations delivered by the rectifiers 190, 191 to that circuit.

Brushes 161 in their endless path of rotation successively make contact with conducting commutator segments 178, 177, 179 in that order, and a circumferentially elongated insulating segment 208 extends between segments 178 and 179, in which zone no current is conducted through any brush 161. This is the "dump" phase of the operation.

Each brush 161 comes into contact with short segment 178 immediately after the associated weigher receptacle 64 has been filled. Assuming an overweight condition causing a cold cathode circuit to be opened, relay contacts 195A will close as a result of this condition, and a circuit is thus established momentarily placing a further control relay 210 in series with the motor 71 through a lead 211 connected to commutator segment 178. Energization of control relay 210 causes closure of its normally open contact 210B, energizing the solenoid 140 (FIG. 8), which elevates the memory pin 135 of the weigher, as previously described.

Continued rotation brings brush 161 into contact with the long conducting segment 177, in which position the feed-off operation previously described takes place. Several of the multiple brushes 161 contact this segment simultaneously and therefore several of the weigher receptacles 64 are enabled to feed off simultaneously during several discharge cycles by the other weigher receptacles 64 of the series. Thus ample time is available for a fine feed-off rate to accurately reduce the overweight condition of any weigher receptacle down to the preset weight desired for the subsebuent packaging operation.

When a brush 161 leaves contact with elongated segment 177 and makes contact momentarily with short segment 179 (immediately preceding the receptacle discharge operation which occurs as the brush travels over the commutator insulating segment 208), a signal lamp 213 is placed in series with the motor through a circuit including a lead 214 wired to segment 179. Since in the event the material in weigher receptacle 64 has not been reduced to weight the contacts 195A will be closed, there results an illumination of lamp 213 and a warning of the operator of an overweight condition.

This in an indication of too fast a feed rate into the weighing receptacle 64 from the main supply feeder 12 during the filling cycle. Since the signal lamp 147 previously described indicates too little material on weigher receptacle 64, which in turn indicates too slow a feed rate by the main feeder, the operator may make corrections in the feed rate of the feeder 12, as provided by the agencies of the tare weight (FIGS. 2 and 4) and/or connecting link turnbuckle 39 of main feeder 12, as well as the speed control rheostat 53 (FIG. 12) of the main feeder 12 and feed-in apparatus elevator 11.

The ability of pan 66 of the composite weigher receptacle 64 to feed off the material lying thereon provides considerable latitude in the acceptable feed rate by the main supply feeder 12; thus the machine is able to function normally without attention from the operator.

Wiring arrangements are shown in FIG. 12 for the several motors 15, 24 and 28 respectively powering the bin belt 14 and elevator belt 20 (FIGS. 1 and 1A) under eddy current clutch control, and for vibrating trough receiver 26 (FIGS. 2 and 4), along with associated limit switches LS1 through LS4, signal lamps 51, 52 and control rheostat 53. Supply leads 169', 170' in parallel with the leads 169, 170 (FIG. 13) power the supply circuit of FIG. 12; and otherwise the specific circuitry of that figure will no doubt be well understood by those skilled in the art.

It is evident that we have provided a high speed weighing machine for bulk material which is entirely automatic in its normal operation, requiring little or no attention after the initiation of its operation. A very accurate charge of weighed material is insured to arrive at the receiving discharge funnel 116, and wastage, resulting from material supply rates so fast as to be difficult to control, has been eliminated by the principle of utilizing a fine feed rate for reducing an overweight charge to any accurate finish weight, and this is done without jeopardizing high speed operation. Further the improved machine is enabled to perform its high speed operation from a single supply source, without resort to multiple supply devices which are expensive and difficult to maintain in a balanced feeding condition.

It is also evident that we have provided a weighing machine capable of delivering the accurate weighed charges at uniform timed intervals, thus aiding subsequent packaging operations. An actual installation of the machine has operated at a speed of up to 60 complete weighing operations per minute, with entirely satisfactory results from a commercial standpoint, in weighing up to 2,000,000 bags of potato chips.

The use of the vibrator isolators 30, 73 and 74 (FIGS. 2, 7 and 8) in association with light-weight receiver trough and pan members and vibratory motors has the effect of dampening directional resistance to a desired high frequency vibration of the receiver members, accompanied by a minimum response of weighing scale or beam members under vibration.

As a typical illustration, let it be assumed that it is desired to weigh out and ultimately discharge a 3-ounce measurement of potato chips. In this instance, each traveling composite receptacle will receive from the main supply chute 3 1/16 ounces to 3 1/2 ounces; 2 1/2 to 3 ounces will fall into the bulk pan of the composite receptacle and the balance will lay in the vibrating or feed off pan. Since variations of 7/16 ounce can be tolerated, an extremely rapid bulk feed can be used without excessive concern over final precision weight. The weighing mechanism in this case might be set for 3 1/16 ounces; that is, slightly over the 3 ounces desired. The weighing mechanism would therefore close its electrical switch and through the control relay and commutator provisions, signal sufficient weight to the memory device as heretofore described. Secondly, the vibrator motor would start the feed-off operation at a rate which may be very slow, as shown below. Assuming a machine having eight weighing receptacles, in excess of five of these receptacles could be in the process of simultaneously feeding-off to weight, since less than three stations are needed to discharge and refill. Since only 1/2 ounce at the most need be fed off to obtain final weight and since in excess of five cycles are available for this operation, it will be seen that a slow feed for accuracy may be used while still producing a very high output rate of finish-weighed charges.

The drawings and the foregoing specification constitute a description of the improved weighing machine in such full, clear, concise and exact terms as to enable any person skilled in the art to practice the invention, the scope of which is indicated by the appended claims.

What we claim as our invention is:

1. A machine for weighing discrete material, comprising a material supply device in the form of a trough having means to agitate material thereon to a discharge point, traveling means continuously discharging material to said supply device and having means to drive said means at a variable rate to discharge in variable amount to said trough of said supply device, weighing means operatively connected to said trough and drive means and responsive to the weight of material on said trough to variably control said drive means to vary said rate of discharge to said supply device, a plurality of weighing receptacles having means to drive the same continuously in an endless path beneath said discharge point to said trough to successively receive material from the latter, each of said reecptacles having a vibratory device acting thereon to agitate the same for a feed-off of material therefrom during the continuous travel thereof, a weighing unit supporting each of said receptacles and having means operatively connecting the same to the vibratory device for the receptacle to control the agitation of the latter in response to the weight of material thereon, and means to successively discharge said material from the receptacles at a discharge zone in their path of travel.

2. A machine for weighing discrete material, comprising a material supply device in the form of a trough having means to agitate material thereon to a discharge point, traveling means continuously discharging material to said supply device and having means to drive said means at a variable rate to discharge in variable amount to said trough of said supply device, weighing means operatively connected to said trough and drive means and responsive to the weight of material on said trough to variably control said drive means to vary said rate of discharge to said supply device, a plurality of weighing receptacles having means to drive the same continuously in an endless path beneath said discharge point of said trough to successively receive material from the latter, each of said receptacles having a vibratory device acting thereon to agitate the same for a feed-off of material therefrom during the continuous travel thereof, a weighing unit supporting each of said receptacles and having means operatively connecting the same to the vibratory device for the receptacle to control the agitation of the latter in response to the weight of material thereon, and means to successively discharge said material from the receptacles at a discharge zone in their path of travel, said operative connecting means of said receptacle weighing units including means to originate a signal in the event of an underweight of material on the receptacle.

3. A machine for weighing discrete material, comprising a material supply device in the form of a trough having means to agitate material thereon to a discharge point, traveling means continuously discharging material to said supply device and having means to drive said means at a variable rate to discharge in variable amount to said trough of said supply device, weighing means operatively connected to said trough and drive means and responsive to the weight of material on said trough to variably control said drive means to vary said rate of discharge to said supply device, a plurality of weighing receptacles having means to drive the same continuously in an endless path beneath said discharge point of said trough to successively receive material from the latter, each of said receptacles having a vibratory device acting thereon to agitate the same for a feed-off of material therefrom during the continuous travel thereof, a weighing unit supporting each of said receptacles and having means operatively connecting the same to the vibratory device for the receptacle to control the agitation of the latter in response to the weight of material thereon, and means to successively discharge said material from the receptacles at a discharge zone in their path of travel, said operative connecting means of said receptacle weighing units including means to prevent operation of the vibratory unit thereof in the event of an underweight of material on the receptacle, and means to originate a signal in the event of such underweight.

4. A machine for weighing discrete material, comprising a material supply device to supply material at a discharge point, a plurality of weighing receptacles having means to drive the same continuously in an endless path past said discharge point of said supply device to successively receive material from the latter, each of said receptacles having a vibratory device acting thereon to agitate the same for a feed-off of material therefrom during the continuous travel thereof, a weighing unit supporting each of said receptacles and having means operatively connecting the same to the vibratory device for the receptacle to control the agitation of the latter in response to the weight of material thereon, said weighing unit also having vibration absorbing means mounting the receptacle thereon to isolate the vibratory agitation of the receptacle from the weighing unit, and means to successively discharge said material from the receptacles at a discharge zone in their path of travel, said operative connecting means of said receptacle weighing units including means to prevent operation of the vibratory unit thereof in the event of an underweight of material on the receptacle, and means to originate a signal in the event of such underweight.

5. A machine for weighing discrete material, comprising a material supply device adapted to discharge material at a discharge point, a plurality of receptacles having means to drive the same continuously in an endless path past said discharge point to successively receive material from said supply device, each of said receptacles having a vibratory device thereon to agitate the same for feed-off of material therefrom during the continuous travel thereof, a weighing unit supporting each of said receptacles and having means operatively connecting the same to the vibratory device of the receptacle to control the agitation of the latter in accordance with the weight of material thereon, and means to successively discharge said material from the receptacles at a discharge zone in their path of travel, said receptacles each including a bulk material receiving part adapted to receive the major portion of a receptacle charge from said supply device and a second feed-off part from which the material is fed-off upon agitation of said receptacle by the vibratory device.

6. A machine for weighing discrete material, comprising a material supply device adapted to discharge material at a discharge point, a plurality of receptacles having means to drive the same continuously in an endless path past said discharge point to successively receive material from said supply device, each of said receptacles having a vibratory device thereon to agitate the same for a feed-off of material therefrom during the continuous travel thereof, a weighing unit supporting each of said receptacles and having means operatively connecting the same to the vibratory device of the receptacle to control the agitation of the latter in accordance with the weight of material thereon, and means to successively discharge said material from the receptacles at a discharge zone in their path of travel, said receptacles each including a bulk material receiving part adapted to receive the major portion of a receptacle charge from said supply device and a second feed-off part from which the material is fed-off upon agitation of said second part by the vibratory device, said vibratory device being mounted on said second part of the receptacle, and said second part having a cushion member supporting the same on said weighing unit.

7. A machine for weighing discrete material, comprising a material supply device adapted to discharge material at a discharge point, a plurality of receptacles having means to drive the same continuously in an endless path past said discharge point to successively receive material from said supply device, each of said receptacles having a vibratory device thereon to agitate the same for a feed-off of material therefrom during the continuous travel thereof, a weighing unit supporting each of said receptacles and having means operatively connecting the same to the vibratory device of the receptacle to control the agitation of the latter in accordance with the weight of material thereon, and means to successively discharge said material from the receptacles at a discharge zone in their path of travel, said operative connecting means of said receptacle weighing units including means to prevent operation of the vibratory device thereof in the event of an underweight of material on the receptacle, and means to originate a signal in the event of such underweight, said receptacles each including a bulk material receiving part adapted to receive the major portion of a receptacle charge from said supply device and a second feed-off part from which the material is fed-off upon agitation of said receptacle by the vibratory device.

8. A machine for weighing discrete material, comprising a material supply device adapted to discharge material at a discharge point, a plurality of receptacles having means to drive the same continuously in an endless path past said discharge point to successively receive material from said supply device, each of said receptacles having a vibratory device thereon to agitate the same for a feed-off of material therefrom during the continuous travel thereof, a weighing unit supporting each of said receptacles and having means operatively connecting the same to the vibratory device of the receptacle to control the agitation of the latter in accordance with the weight of material thereon, and means to successively discharge said material from the receptacles at a discharge zone in their path of travel, said operative connecting means of said receptacle weighing units including means to prevent operation of the vibratory device thereof in the event of an underweight of material on the receptacle, and means to originate a signal in the event of such underweight, said receptacles each including a bulk material receiving part adapted to receive the major portion of a receptacle charge from said supply device and a second feed-off part from which the material is fed-off upon agitation of said second part by the vibratory device, said vibratory device being mounted on said second part of the receptacle, and said second part having a cushion member supporting the same on said weighing unit.

9. A machine for weighing discrete material, comprising a material supporting supply device adapted to discharge material at a discharge point, traveling means adapted to continuously discharge material to said supply device, said traveling means having provision to drive the same at a variable rate to thereby discharge in variable amount to said supply device, weighing means operatively connected to said device and drive means and responsive to the weight of material on the former to variably control said drive means and said rate of discharge to said device in accordance with the weight of material on the latter, and a plurality of weighing receptacles having means to drive the same in an endless path past said discharge point of said supply device to successively receive material from the latter, each of said receptacles having a vibratory device acting thereon to agitate the same for a feed-off of material therefrom during the continuous travel thereof, and means controlling said agitation of the receptacle in accordance with the weight of material thereon, said receptacles each including a bulk material receiving part adapted to receive the major portion of a receptacle charge from said supply device and a second feed-off part on which one of said devices is mounted to agitate said second part.

10. A method of weighing discrete material, comprising continuously moving a series of weighing receptacles past a common discharge point at which they are supplied with material, substantially continuously feeding the material to said discharge point, causing the charge of material received by each receptacle to exceed a predetermined desired weight, vibrating said receptacles during the travel thereof to occasion a feed-off of excess material thereof, weighing the receptacles and their content during said travel, and controlling the extent of said feed-off of excess material variably in response to the weight as determined by so weighing, and variably controlling the feed of the material to said discharge point in response to said determination.

11. A method of weighing discrete material, comprising continuously moving a series of weighing receptacles past a common discharge point at which they are supplied with material, substantially continuously feeding the material to said discharge point, causing the charge of material received by each receptacle to exceed a predetermined desired weight, vibrating said receptacles during the travel thereof to occasion a feed-off of excess material thereof, weighing the receptacles and their content during said travel, and controlling the extent of said feed-off of excess material variably in response to the weight as determined by so weighing, variably controlling the feed of the material to said discharge point in response to said determination, discharging the content of receptacles having said predetermined desired weight, and originating a signal in regard to receptacles having an underweight of material therein.

12. Apparatus for weighing bulk materials, comprising a plurality of material receiving devices, each comprising a receptacle to receive one portion of a charge of material to be weighed and a further receptacle to receive another portion of the charge, means conveying said material receiving devices for travel continuously in an endless path, and means operatively connected to each of said material receiving devices to vibrate said further receptacle during said travel to discharge material therefrom until said charge is decreased in weight to a predetermined value.

13. Apparatus for weighing bulk materials, comprising a plurality of material receiving devices, each comprising a receptacle to receive one portion of a charge of material to be weighed and a further receptacle to receive another portion of the charge, means conveying said material receiving devices for travel continuously in an endless path, each of said devices having a weighing device operatively connected to and traveling therewith and responsive to changing weight of the charge during said travel, and means operatively connected to each of said material receiving devices to vibrate said further receptacle during said travel to discharge material therefrom until said charge is decreased in weight to a predetermined value as determined by its weighing device.

14. Apparatus for weighing bulk materials, comprising a plurality of material receiving devices, each comprising a receptacle to receive one portion of a charge of material to be weighed and a further receptacle to receive another portion of the charge, means conveying said material receiving devices for travel continuously in an endless path, each of said devices having a weighing device operatively connected to and traveling therewith and responsive to changing weight of the charge during said travel, and means operatively connected to each of said material receiving devices to vibrate said further receptacle during said travel to discharge material therefrom until said charge is decreased in weight to a predetermined value as determined by its weighing device, said material receiving devices each being provided with vibration absorbing means to insulate said respective weighing devices from vibration.

15. Apparatus for weighing bulk materials, comprising a plurality of material receiving devices, each comprising a receptacle to receive one portion of a charge of material to be weighed and a further receptacle to receive another portion of the charge, means conveying said material receiving devices for travel continuously in an endless path, each of said devices having a weighing device operatively connected to and traveling therewith and responsive to changing weight of the charge during said travel, and means operatively connected to each of said material receiving devices to vibrate said further receptacle during said travel to discharge material therefrom until said charge is decreased in weight to a predetermined value as determined by its weighing device, said material receiving devices each being provided with vibration absorbing means mounting said further, vibrated receptacle to insulate said respective weighing devices from vibration.

16. Apparatus for weighing bulk materials, comprising a plurality of material receiving devices, each comprising a receptacle to receive one portion of a charge of material to be weighed and a further receptacle to receive another portion of the charge, means conveying said material receiving devices for travel continuously in an endless path, each of said devices having a weighing device operatively connected to and traveling therewith and responsive to changing weight of the charge during said travel, and means operatively connected to each of said material receiving devices to vibrate said further receptacle during said travel to discharge material therefrom until said charge is decreased in weight to a predetermined value as determined by its weighing device, said weighing devices having means operatively connecting the same to the respective vibrating means to terminate said vibration when said value is reached, said material receiving devices each being provided with vibration absorbing means to insulate said respective weighing devices from vibration.

17. Apparatus for weighing bulk materials, comprising a material receiving device including a first receptacle to receive one portion of a charge of material to be weighed and a further receptacle to receive another portion of the charge, said device having a weighing device operatively connected thereto and responsive to a changing weight of the charge, and means operatively connected to said material receiving device to vibrate said further receptacle until said charge is decreased in weight to a predetermined value as determined by said weighing device.

18. Apparatus for weighing bulk materials, comprising a material receiving device including a first receptacle to receive one portion of a charge of material to be weighed and a further receptacle to receive another portion of the charge, said device having a weighing device operatively connected thereto and responsive to a changing weight of the charge, and means operatively connected to said material receiving device to vibrate said further receptacle until said charge is decreased in weight to a predetermined value as determined by said weighing device, said material receiving device being provided with vibration absorbing means to insulate said weighing device from vibration.

19. Apparatus for weighing bulk materials, comprising a material receiving device including a first receptacle to receive one portion of a charge of material to be weighed and a further receptacle to receive another portion of the charge, said device having a weighing device operatively connected thereto and responsive to a changing weight of the charge, and means operatively connected to said material receiving device to vibrate said further receptacle until said charge is decreased in weight to a predetermined value as determined by said weighing device, said material receiving device being provided with vibration absorbing means mounting said further, vibrated receptacle to insulate said weighing device from vibration.

20. Apparatus for weighing bulk materials, comprising a material receiving device including a first receptacle to receive one portion of a charge of material to be weighed and a further receptacle to receive another portion of the charge, said device having a weighing device operatively connected thereto and responsive to a changing weight of the charge, and means operatively connected to said material receiving device to vibrate said further receptacle until said charge is decreased in weight to a predetermined value as determined by said weighing device, said weighing device having means operatively connecting the same to said vibrating means to terminate said vibration when said value is reached.

21. Apparatus for weighing bulk materials, comprising a material receiving device including a first receptacle to receive one portion of a charge of material to be weighed and a further receptacle to receive another portion of the charge, said device having a weighing device operatively connected thereto and responsive to a changing weight of the charge, and means operatively connected to said material receiving device to vibrate said further receptacle until said charge is decreased in weight to a predetermined value as determined by said weighing device, said weighing device having means operatively connecting the same to said vibrating means to terminate said vibration when said value is reached, said material receiving device being provided with vibration absorbing means to insulate said weighing device from vibration.

22. A machine for weighing discrete material, comprising a plurality of material transporting receptacle units having means to drive the same for travel in an endless path past a dump station, each of said units including a pair of material carrying members which are respectively of larger and smaller material receiving capacity and each unit having weighing means operatively connected thereto, means for supplying material to both members of each unit during travel and prior to arrival at said dump station, said members being in adjacent relation to one another to simultaneously receive material from said supply means, said weighing means comprising a weighing device supporting said members on said drive means and weighing the material during travel, and means controlled by said weighing device and acting to discharge material from the smaller capacity member only of the unit during said travel to said dump station and until the material in the unit has reached a proper weight determined by its weighing device.

23. A machine for weighing discrete material, comprising a plurality of material transporting receptacle units having means to drive the same for travel in an endless path past a dump station, each of said units including a pair of material carrying members which are respectively of larger and smaller material receiving capacity and each unit having weighing means operatively connected thereto, means for supplying material to both members of each unit during travel and prior to arrival at said dump station, said members being in adjacent relation to one another to simultaneously receive material from said supply means, said weighing means comprising a weighing device supporting said members on said drive means and weighing the material during travel, and a vibratory device controlled by said weighing device and acting to agitate material carried by the smaller capacity members only of the unit for the discharge of material from said member during said travel to said dump station and until the material in the unit has reacher a proper weight determined by its weighing device.

24. A machine for weighing discrete material, comprising a material supply device adapted to discharge material, a plurality of two-part receptacles having means to drive the same continuously in an endless path of travel during which they receive material from said supply device, each of said receptacles having a vibratory device connected to one part thereof to agitate the same for a feed-off of material from that part alone during the continuous travel thereof, a weighing unit for each receptacle and having means operatively connecting the same to said vibratory device to control the agitation of said part thereof in accordance with the weight of material on the receptacle, and means to successively discharge said material from the receptacles at a discharge zone in their path of travel, the parts of each receptacle including a bulk material receiving part adapted to receive the major portion of a charge of material from said supply device during said travel and a second feed-off part also simultaneously receiving material from said supply device during said travel, to which second part the vibratory device is connected and from which second part alone material is vibrationally fed-off during travel.

25. A machine in accordance with claim 24, said machine comprising a circuit including a spring contact unit responsive to said weighing unit to signal in the event of an underweight of material received by the receptacles from said supply device or an overweight of the material following weighing.

26. A machine for weighing discrete material, comprising a material supply device adapted to discharge material at a discharge point, a plurality of two-part receptacles having means to drive the same continuously in an endless path of travel past said discharge point to successively receive material from said supply device, each of said receptacles having a vibratory device connected to one part thereof to agitate the same for a feed-off of material from that part alone during the continuous travel thereof, a weighing unit for each receptacle and having means operatively connecting the same to said vibratory device to control the agitation of said part thereof in accordance with the weight of material on the receptacle, and means to successively discharge said material from the receptacles at a discharge zone in their path of travel, the parts of each receptacle including a bulk material receiving part adapted to receive the major portion of a charge of material from said supply device during said travel and a second feed-off part also simultaneously receiving material from said supply device during said travel, to which second part the vibratory device is connected and from which second part alone material is vibrationally fed-off during travel.

27. A machine in accordance with claim 26, said machine comprising a circuit including a spring contact unit responsive to said weighing unit to signal in the event of an underweight of material received by the receptacles from said supply device or an overweight of the material following weighing.

28. Apparatus for weighing bulk material, comprising a plurality of material receiving devices, each comprising a receptacle to receive one portion of a charge of the material to be weighed and a further receptacle to receive further material, means conveying said material receiving devices continuously in an endless path past a dump station of travel, means to supply material to both receptacles of each device during the travel thereof, and means operatively connected to said material receiving devices to discharge material from at least one of said receptacles thereof during said travel to said dump station.

References Cited in the file of this patent

UNITED STATES PATENTS

| | | |
|---|---|---|
| 600,039 | Richards | Mar. 1, 1898 |
| 600,040 | Richards | Mar. 1, 1898 |
| 618,383 | Richards | Jan. 24, 1899 |
| 633,218 | Richards | Sept. 19, 1899 |
| 638,673 | Richards | Dec. 5, 1899 |
| 1,081,723 | Curry | Dec. 16, 1913 |
| 2,373,838 | Lindholm | Apr. 17, 1945 |
| 2,619,256 | Wiley | Nov. 25, 1952 |
| 2,626,042 | Aldridge | Jan. 20, 1953 |
| 2,650,791 | Adams | Sept. 1, 1953 |
| 2,662,665 | Harper | Dec. 15, 1953 |
| 2,688,740 | Merrill et al. | Sept. 7, 1954 |
| 2,736,922 | Schieser | Mar. 6, 1956 |
| 2,833,506 | Gunderson | May 6, 1958 |
| 2,901,209 | Bardy et al. | Aug. 25, 1959 |
| 2,904,304 | Zwoyer et al. | Sept. 15, 1959 |